United States Patent
Tanuwidjaja et al.

(10) Patent No.: US 11,684,068 B2
(45) Date of Patent: *Jun. 27, 2023

(54) HERBICIDAL COMPOSITIONS AND METHODS OF USE THEREOF

(71) Applicant: Valent U.S.A. LLC, Walnut Creek, CA (US)

(72) Inventors: Jessica Tanuwidjaja, Fremont, CA (US); Tak Wai Cheung, Mountain House, CA (US)

(73) Assignee: VALENT U.S.A., LLC, San Ramon, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 16/227,310

(22) Filed: Dec. 20, 2018

(65) Prior Publication Data

US 2019/0200615 A1 Jul. 4, 2019

Related U.S. Application Data

(60) Provisional application No. 62/613,113, filed on Jan. 3, 2018.

(51) Int. Cl.
| | | |
|---|---|---|
| *A01N 43/84* | (2006.01) | |
| *A01N 43/80* | (2006.01) | |
| *A01N 37/40* | (2006.01) | |
| *A01N 57/20* | (2006.01) | |

(Continued)

(52) U.S. Cl.
CPC ............ *A01N 43/84* (2013.01); *A01N 37/40* (2013.01); *A01N 39/04* (2013.01); *A01N 43/707* (2013.01); *A01N 43/80* (2013.01); *A01N 57/20* (2013.01)

(58) Field of Classification Search
CPC ........ A01N 43/84; A01N 43/80; A01N 37/40; A01N 57/20; A01N 39/04; A01N 43/707
See application file for complete search history.

(56) References Cited

U.S. PATENT DOCUMENTS

| | | | | |
|---|---|---|---|---|
| 2011/0065579 A1* | 3/2011 | Sievernich | ............. | A01N 33/18 504/128 |
| 2015/0099630 A1* | 4/2015 | Ikeda | ................... | A01N 43/653 504/128 |

(Continued)

FOREIGN PATENT DOCUMENTS

| | | | | | |
|---|---|---|---|---|---|
| CN | 102293212 B | * | 6/2014 | | |
| CN | 104396982 A | * | 3/2015 | | |
| WO | WO-2017083409 A2 | * | 5/2017 | ............. | A01N 39/04 |

OTHER PUBLICATIONS

Piper Herbicide Safety Data Sheet, 2015, Valent Professional Product, SDS No. 0439, pp. 1-11. (Year: 2015).*

(Continued)

*Primary Examiner* — Bethany P Barham
*Assistant Examiner* — Ayaan A Alam
(74) *Attorney, Agent, or Firm* — Wood, Phillips, Katz, Clark & Mortimer

(57) ABSTRACT

The present invention is directed to an herbicidal composition comprising metribuzin, flumioxazin, pyroxasulfone, a salting-out agent and polyvinyl alcohol. The present invention is further directed to a method of controlling weeds comprising applying a composition of the present invention to the weeds or an area in need of weed control.

7 Claims, 1 Drawing Sheet

(51) Int. Cl.
*A01N 39/04* (2006.01)
*A01N 43/707* (2006.01)

(56) References Cited

U.S. PATENT DOCUMENTS

2016/0174551 A1* 6/2016 Shroff .................... A01N 43/70
                                                          504/127
2018/0235208 A1* 8/2018 Faers ..................... A01N 47/40

OTHER PUBLICATIONS

Fierce Herbicide Booklet Label, 2014, Valent, pp. 1-17 (Year: 2014).*
Lee, J. et al., Composition used for preventing and controlling grassy weed and broadleaf weed in corn field, comprises diuron and flumioxazin (CN 104396982A), 2015, Derwent Abstract, 5 pages. (Year: 2015).*
Synergy with Organic Gums and Polymers, Veegum/Van Gel: The Products, 2015, RT Vanderbilt, pp. 1-9. (Year: 2015).*
Fierce Herbicide Label, Jul. 2016, Valent U.S.A. Corporation,2016-FIE-0001, pp. 1-15. (Year: 2016).*

* cited by examiner

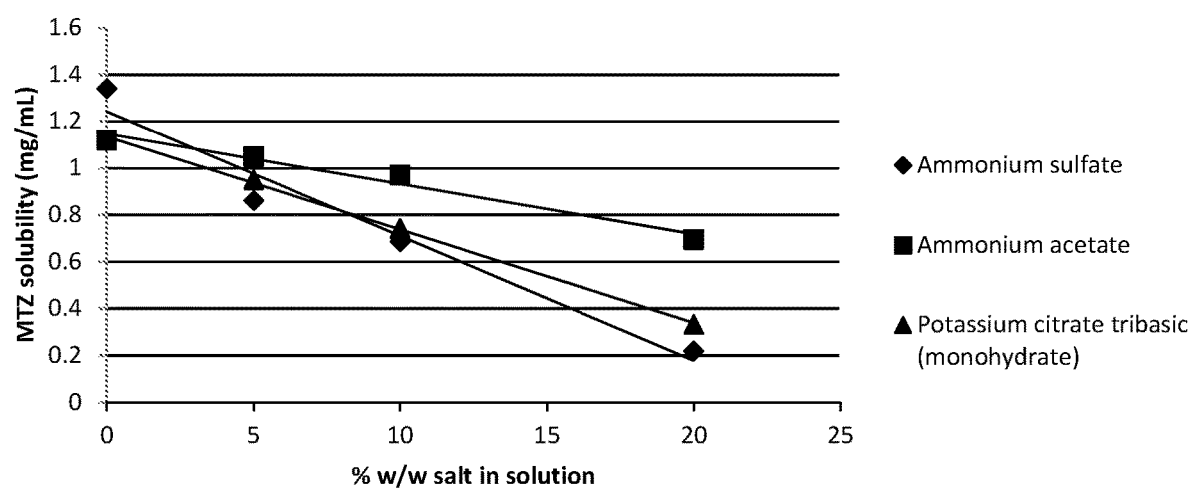

HERBICIDAL COMPOSITIONS AND METHODS OF USE THEREOF

FIELD OF THE INVENTION

The present invention relates to an aqueous herbicidal composition comprising metribuzin, flumioxazin, pyroxasulfone, a salting-out agent and polyvinyl alcohol. The present invention further relates to a method of controlling weeds comprising applying a composition of the present invention to the weeds or an area in need of weed control.

BACKGROUND OF THE INVENTION

Unwanted plants, such as weeds, reduce the amount of resources available to crop plants and can have a negative effect on crop plant yield and quality. For example, a weed infestation reportedly was responsible for an 80% reduction in soybean yields. Bruce, J. A., and J. J. Kells, Horseweed (*Conyza Canadensis*) control in no-tillage soybeans (*Glycine max*) with preplant and preemergence herbicides, Weed Technol. 4:642-647 (1990). Therefore, controlling weeds is a major concern of crop growers. Unwanted plants in crop plant environments include broadleaves, grasses and sedges.

Roundup Powermax® (available from Monsanto Technology LLC) and other high-electrolyte herbicide formulations utilizing glyphosate or dicamba, have become widely used in areas in need of weed control. For example, there are many varieties of agricultural crops, such as soybeans, corn, cotton and wheat that are resistant to glyphosate or dicamba making its use to control weeds among these crops ideal. However, significant increase in the area where glyphosate is applied leads to an increase in the potential infestation of glyphosate-resistance weeds. For controlling glyphosate-resistant weeds, glyphosate and dicamba formulations are often added to tank mixes of other herbicidal formulations having a different mode of action.

Often, when multiple herbicides are applied concurrently they are added as suspension concentrates to form a tank mix prior to application. However, when adding multiple herbicide formulations to form a tank mix the user must ensure that the formulations are mixed homogenously to ensure good spray characteristics and consistent delivery of the active ingredients throughout the application area. Despite its popularity, many current herbicide formulations do not have good mixing behavior with Roundup Powermax® and other high-electrolyte herbicide formulations.

Flumioxazin is a protoporphyrinogen oxidase ("PPO") inhibitor used as an herbicide to control weeds among soybeans, peanuts, orchard fruits and many other agricultural crops in the United States and worldwide. Flumioxazin is effective in controlling glyphosate-resistant and tough-to-control weeds.

Pyroxasulfone is relatively new isooxazoline herbicide that inhibits synthesis of very-long-chain fatty acids. Pyroxasulfone is used to control weeds among many agricultural crops including corn and soybean.

Metribuzin is a photosynthesis inhibiting herbicide used to control weeds among many agricultural crops including soybeans, potatoes, tomatoes and sugar cane. Metribuzin is often combined in the field with aqueous high-electrolyte herbicide formulations. For handling purposes during tank-mixing, it is most convenient to formulate metribuzin in the liquid (flowable) form. It would be even more desirable to obtain an aqueous suspension (rather than systems incorporating organic solvents), for environmental safety and phytotoxicity purposes. However, metribuzin is partially water soluble (1050 mg/L at 20° C.) causing it to be prone to crystal growth in these aqueous formulations via Ostwald ripening.

Accordingly, there is a need in the art for herbicide compositions that can stabilize metribuzin in an aqueous formulation and have favorable mixing characteristics (e.g. homogeneity and suspensibility) with Roundup Powermax® and other high-electrolyte herbicide formulations.

SUMMARY OF THE INVENTION

In one embodiment, the present invention is directed to an aqueous herbicidal composition comprising metribuzin, flumioxazin, pyroxasulfone, a salting-out agent and polyvinyl alcohol.

In another embodiment, the present invention is directed to a method of controlling weeds comprising applying a composition of the present invention to the weeds or an area in need of weed control.

BRIEF DESCRIPTION OF THE DRAWINGS

FIG. 1. Metribuzin solubility in salt solutions.

DETAILED DESCRIPTION OF THE INVENTION

Salts are known to affect solubility of protein in water. In a process known as "salting-out", salts are added to aqueous protein solutions to lower the water solubility and precipitate out the protein. This process is commonly used in the early and later stages of protein purification process.

Applicant discovered that the "salting-out" properties can likewise be utilized to lower metribuzin solubility in aqueous solutions. See FIG. 1. In an aqueous suspension, this lowering of metribuzin solubility prevents dissolution of the suspended particles, which is the first step in Ostwald ripening, and thus reduces particle size growth. These salting-out agents have advantages over prior art agents used to stabilize metribuzin such as dispersants derived from sulfonated lignins. These dispersants also control particle size growth due to Ostwald ripening, such as that seen with metribuzin. However, Applicant has demonstrated that suspensions utilizing sulfonated lignins rapidly flocculate and settle in mixtures having a high electrolyte concentration. This flocculation and settling likely will lead to inhomogeneity with high-electrolyte herbicides such as Roundup Powermax® and dicamba, thus reducing the benefits of co-application.

Applicant further discovered that the addition of polyvinyl alcohol further inhibited crystal formation in aqueous metribuzin compositions.

In one embodiment, the present invention is directed to an aqueous herbicidal composition comprising:
  metribuzin;
  flumioxazin;
  pyroxasulfone;
  a salting-out agent; and
  polyvinyl alcohol.

In a preferred embodiment, metribuzin is present at a concentration from about 1% to about 50% w/w, from about 1% to about 45% w/w, from about 1% to about 38% w/w, from about 10% to about 20% w/w, from about 15% to about 17% w/w, about 15.9% w/w or about 15.86% w/w.

In another preferred embodiment, flumioxazin is present at a concentration from about 1% to about 15% w/w, from about 4% to about 12% w/w, about 5.3% w/w or about 5.29% w/w.

In yet another preferred embodiment, pyroxasulfone is present at a concentration from about 1% to about 10% w/w, from about 5% to about 7% w/w, about 6.8% w/w or about 6.76% w/w.

As used herein, "salting-out agent" or "salting-out agents" are compounds that lower the water solubility of metribuzin.

In a preferred embodiment, the salting-out agent is a salt having a molecular weight less than about 500 grams per mole and a water solubility of greater than about 20% w/w at a temperature from about 20 to about 25 degrees Celsius.

In a preferred embodiment, the salting-out agent is a salt having a cation selected from the group consisting of aluminum, ammonium, potassium, sodium, lithium, magnesium, calcium and iron and or an anion selected from the group consisting of citrate, tartrate, fluoride, sulfate, sulfonate, phosphate/hydrogenphosphate, acetate, chloride, nitrate, bromide, chlorate, iodide, perchlorate and thiocyanate. More preferably, the salting-out agent is selected from ammonium sulfate, ammonium acetate and potassium citrate.

In another preferred embodiment, the salting-out agent is present at a concentration from about 1% to about 10% w/w, from about 1% to about 6% w/w, from about 1.8% to about 3.0% w/w, from about 2.0% to about 2.9% w/w or about 2.0% w/w, about 2.8% w/w or about 2.9% w/w.

In another preferred embodiment, the polyvinyl alcohol is present at a concentration from about 1% to about 10% w/w, from about 1% to about 5% w/w, from about 1.2% to about 3.0% w/w or from about 1.4% to about 2.9% w/w or about 1.4% w/w, about 1.5% w/w, about 2.8% w/w or about 2.9% w/w.

In another preferred embodiment, the present invention is directed to an aqueous herbicidal composition comprising:
from about 10% to about 20% w/w metribuzin;
from about 1% to about 15% w/w of flumioxazin;
from about 1% to about 10% w/w pyroxasulfone;
from about 1% to about 6% w/w of a salt selected from ammonium sulfate, ammonium acetate and potassium citrate; and
from about 1% to about 5% w/w polyvinyl alcohol.

In another preferred embodiment, the present invention is directed to an aqueous herbicidal composition comprising:
from about 15% to about 17% w/w metribuzin;
from about 4% to about 12% w/w flumioxazin;
from about 5% to about 7% w/w pyroxasulfone;
ammonium sulfate at a concentration from about 1.8% to about 3.0% w/w; and
polyvinyl alcohol at a concentration from about 1.2% to about 3.0% w/w.

In another preferred embodiment, the present invention is directed to an aqueous herbicidal composition comprising:
about 15.9% w/w metribuzin;
about 5.3% w/w flumioxazin;
about 6.8% w/w pyroxasulfone;
about 2.8% w/w ammonium sulfate; and
about 2.8% w/w polyvinyl alcohol.

In another preferred embodiment, the present invention is directed to an aqueous herbicidal composition comprising:
about 15.9% w/w metribuzin;
about 5.3% w/w flumioxazin;
about 6.8% w/w pyroxasulfone;
about 2.0% w/w ammonium sulfate; and
about 1.4% w/w polyvinyl alcohol.

In another preferred embodiment, the present invention is directed to an aqueous herbicidal composition comprising:
about 15.9% w/w metribuzin;
about 5.3% w/w flumioxazin;
about 6.8% w/w pyroxasulfone;
about 2.8% w/w ammonium sulfate;
about 2.8% w/w polyvinyl alcohol;
about 4% w/w of a 35% acrylic graft copolymer;
about 2% w/w of an alkylphenol ethoxylate free nonionic wetter;
about 4% w/w propylene glycol;
about 0.1% w/w of a silicone emulsion;
about 0.15% w/w of a mixture of 1.15% 5-chloro-2-methyl-4-isothiazolin-3-one and 0.35% 2-methyl-4-isothiazolin-3-one; and
about 1% w/w magnesium aluminum silicate.

In another preferred embodiment, the present invention is directed to an aqueous herbicidal composition comprising:
about 15.9% w/w metribuzin;
about 5.3% w/w flumioxazin;
about 6.8% w/w pyroxasulfone;
about 2.0% w/w ammonium sulfate;
about 1.4% w/w polyvinyl alcohol;
from about 4% to about 6% w/w of a 35% acrylic graft copolymer;
about 2% w/w of an alkylphenol ethoxylate free nonionic wetter;
about 4% w/w propylene glycol;
about 0.3% w/w of a silicone emulsion;
about 0.2% w/w of 19.3% 1, 2-benzisothiazolin-3-one;
from about 0.50% to about 0.75% w/w magnesium aluminum silicate; and
from about 0.15% to about 0.225% w/w hydroxyethyl cellulose.

Compositions of the present invention may further comprise one or more excipients selected from the group consisting of a surfactant, an antifoaming agent, an antifreeze agent, a preservative and a thickener.

Surfactants suitable for use in the present invention include, but are not limited to, polyoxyethylene aryl or alkyl phosphates or sulfates such as potassium salt of polyoxyethylene tristyrylphenol phosphate, dodecylbenzene sulfonate salts, methyloxirane polymer, styrene methacrylic copolymer, polyvinylpyrrolidone and methyl vinyl ether/maleic acid half ester copolymer, acrylic graft copolymers and an alkylphenol ethoxylate free nonionic wetter.

In another preferred embodiment, the 35% acrylic graft copolymer may be present at a concentration from about 0.1% to about 8% w/w, more preferably from about 2% to about 7% w/w, even more preferably from about 4% to about 6% w/w and most preferably about 4% w/w or about 6% w/w.

In another preferred embodiment, the 35% acrylic graft copolymer has a density of 1.07 g/mL at 25° C., a flash point of greater than 100° C., a pour point of less than 0° C. and a viscosity of 200 mPa·s at 25° C.

In another preferred embodiment, the alkylphenol ethoxylate free nonionic wetter may be present at a concentration from about 0.1% to about 5% w/w, from about 1% to about 3% w/w or about 2% w/w.

In another preferred embodiment, the potassium salt of polyoxyethylene tristyrylphenol phosphate may be present at a concentration from about 0.1% to about 5% w/w, from about 1% to about 3% w/w or about 2% w/w.

Antifoaming agents suitable for use in the present invention include, but are not limited to, silicone antifoaming agents including silicone emulsions, vegetable oils, acetylenic glycols, and high molecular weight adducts of propylene oxide and lower polyoxyethylene and polyoxypropylene block polymers (wherein the number of octyl-, nonyl- and phenylpolyoxyethylene/ethylene oxide units is >5) and long-chain alcohols and mixtures thereof. In a preferred embodiment, the antifoaming agent is a silicone emulsion. Antifoaming agents may be present at a concentration from about 0.01% to about 1% w/w, from about 0.05% to about 0.5% w/w or from about 0.1% to about 0.3% w/w, or about 0.1% w/w, about 0.15% w/w or about 0.3% w/w.

Antifreeze agents suitable for use in the present invention include, but are not limited to, ethylene glycol, propylene glycol, 1,2-butanediol, 1,3-butanediol, 1,4-butanediol, 1,4-pentanediol, 3-methyl-1,5-pentanediol, 2,3-dimethyl-2,3-butanediol, trimethylol propane, mannitol, sorbitol, glycerol, pentaerythritol, 1,4-cyclohexanedimethanol, xylenol, and bisphenols such as bisphenol A. In a preferred embodiment, the antifreeze agent is propylene glycol. Antifreeze agents may be present at a concentration from about 1% to about 10% w/w, from about 2% to about 9% w/w and about 4% w/w or about 6% w/w.

Preservatives suitable for use in the present invention include, but are not limited to, a mixture of 5-chloro-2-methyl-4-isothiazolin-3-one and 2-methyl-4-isothiazolin-3-one, 1, 2-benzisothiazolin-3-one and a mixture of 1, 2-benzisothiazolin-3-one and 2-bromo-2-nitro-1,3-propanediol. In a preferred embodiment the preservative is 19.3% 1, 2-benzisothiazolin-3-one or a mixture of 5-chloro-2-methyl-4-isothiazolin-3-one and 2-methyl-4-isothiazolin-3-one, 1, 2-benzisothiazolin-3-one. Preservatives may be present at a concentration from about 0.1% to about 1% w/w, from about 0.1% to about 0.3% w/w, about 0.15% w/w or about 0.2% w/w.

Thickeners suitable for use in the present invention include, but are not limited to, magnesium aluminum silicate, hydrophilic fumed silica, aluminum oxide, hydroxy alkyl celluloses and mixtures thereof. Preferred hydroxy alkyl celluloses include hydroxyethyl cellulose. Thickeners may be present at a concentration from about from about 0.5% to about 4.0% w/w, from about 0.7% to about 2% w/w, from about 0.5% to about 1.0% w/w, or, about 0.15% w/w, 0.5% w/w, about 0.6% w/w, about 0.725% w/w, about 0.75% w/w, about 0.8% w/w, about 0.9% w/w, about 0.96% w/w or about 1% w/w.

In another embodiment, the present invention is directed to a method of controlling a weed comprising applying the composition of the present invention to the weed or an area in need of weed control.

In another embodiment, the present invention is directed to a method of controlling a weed comprising applying the composition of the present invention sequentially or concurrently with a compound selected from the group consisting of glyphosate, glufosinate, dicamba, 2,4-D and mixtures thereof to the weed or an area in need of weed control.

The compositions of the present invention can be applied to any environment in need of weed control. The environment in need of weed control may include any area that is desired to have a reduced number of weeds or to be free of weeds. For example, the composition can be applied to an area used to grow crop plants, such as a field, orchard, or vineyard. For example, compositions and methods of the present invention can be applied to areas where soybeans, corn, peanuts, and cotton are growing. In a preferred embodiment, the composition is applied in an area where a broadleaf crop (soybean, cotton, peanut, orchard, vineyard, forages) is growing. The compositions of the present invention can also be applied to non-agricultural areas in need of weed control such as lawns, golf courses, or parks.

The compositions of the present invention can be applied by any convenient means. Those skilled in the art are familiar with the modes of application that include foliar applications such as spraying and chemigation (a process of applying the composition through the irrigation system).

The compositions of the present invention can be prepared as concentrate formulations or as ready-to-use formulations. The compositions can be tank mixed.

The compositions and methods of the present invention can be applied successfully to crop plants and weeds that are resistant to glyphosate, glufosinate, or other herbicides. The composition and methods can also be applied to areas where genetically modified crops ("GMOs") or non-GMO crops are growing. The term "GMO crops" as used herein refers to crops that are genetically modified.

Throughout the application, the singular forms "a," "an," and "the" include plural reference unless the context clearly dictates otherwise.

As used herein, all numerical values relating to amounts, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

These representative embodiments are in no way limiting and are described solely to illustrate some aspects of the invention.

Further, the following examples are offered by way of illustration only and not by way of limitation.

EXAMPLES

TABLE 1

| | Compositions of the Invention | | | | | | |
|---|---|---|---|---|---|---|---|
| Composition | 1 | 2 | 3 | 4 | 5 | 6 | 7 |
| Metribuzin | 15.86% | 15.86% | 15.86% | 15.86% | 15.86% | 15.86% | 15.86% |
| Pyroxasulfone | 6.76% | 6.76% | 6.76% | 6.76% | 6.76% | 6.76% | 6.76% |
| Flumioxazin | 5.29% | 5.29% | 5.29% | 5.29% | 5.29% | 5.29% | 5.29% |
| 35% Acrylic graft copolymer | 4% | 4% | 4% | 4% | 4% | 6% | 4% |
| Alkylphenol ethoxylate free nonionic wetter | 2% | 2% | 2% | — | 2% | 2% | 2% |
| Polyoxyethylene tristyrylphenol phosphate, potassium salt | — | — | — | 2% | — | — | — |
| Propylene glycol | 6% | 4% | 4% | 4% | 4% | 4% | 4% |
| Polyvinyl alcohol (as active) | 0%-2.9% | 0%-2.8% | 0%-2.8% | 0%-2.8% | 1.4% | 1.4% | 1.5% |

TABLE 1-continued

Compositions of the Invention

| Composition | 1 | 2 | 3 | 4 | 5 | 6 | 7 |
|---|---|---|---|---|---|---|---|
| Ammonium sulfate | 0%-2.9% | 0%-2.8% | 0%-2.8% | 0%-2.8% | 2.0% | 2.0% | 2.8% |
| Potassium citrate | — | 0%-5.6% | — | — | — | — | — |
| Silicone emulsion | 0.1% | 0.1% | 0.1% | 0.1% | 0.3% | 0.3% | 0.15% |
| Mixture of 1.15% 5-chloro-2-methyl-4-isothiazolin-3-one and 0.35% 2-methyl-4-isothiazolin-3-one | — | 0.15% | 0.15% | 0.15% | — | — | 0.15% |
| 19.3% 1, 2-benzisothiazolin-3-one | 0.2% | — | — | — | 0.2% | 0.2% | — |
| Magnesium aluminum silicate | 0.5% | 1% | — | 1% | 0.5% | 0.75% | 1.0% |
| Hydrophilic fumed silica | — | — | 0.8% | — | — | — | — |
| Aluminum oxide | — | — | 0.16% | — | — | — | — |
| Xanthan gum | 0.1% | — | — | — | — | — | — |
| Hydroxyethyl cellulose | — | — | — | — | 0.225% | 0.15% | — |

Tersperse® 2500 is used as the source of 35% graft copolymer and is available from Huntsman Petrochemical Corporation.

Tersperse® 4894 (CAS #68131-39-5) is used as the source of alkylphenol ethoxylate free nonionic wetter and dispersant package (Tersperse is a registered trademark of and is available from Huntsman Petrochemical Corporation).

Stepfac™ TSP PE-K (CAS #163436-84-8) is used as the source of polyoxyethylene tristyrylphenol phosphate, potassium salt and is available from Stepan Corp.

Selvol® 24-203, 9-523 (CAS #25213-24-5) or Selvol® 15-103 (CAS #9002-89-5) are used as the sources of polyvinyl alcohol and are available from Sekisui Specialty Chemicals America, LLC.

Xiameter® AFE-0010 is used as the source of silicone emulsion and is available from Dow Corning Corporation.

Kathon® CG/ICP is used as the source of a mixture of 1.15% 5-chloro-2-methyl-4-isothiazolin-3-one (CAS #26172-55-4) and 0.35% 2-methyl-4-isothiazolin-3-one (CAS #2682-20-4) and is available from Dow Chemical Company.

Proxel® GXL is used as the source of 19.3% 1, 2-benzisothiazolin-3-one and is a registered trademark of Arch UK Biocides and is available from Lonza.

Van Gel® B (CAS #1302-78-9 or #12199-37-0) or Veegum® R (CAS #1302-78-9 or #12199-37-0) is used as the source of magnesium aluminum silicate and is available from Vanderbilt Minerals, LLC.

Aerosil® 200 (CAS #112 945-52-5, 7631-86-9) is used as the source of hydrophilic fumed silica and is available from Evonik Industries.

Aeroxide® Alu C (CAS #1344-28-1) is used as the source of aluminum oxide and is available from Evonik Industries.

Kelzan® BT is used as the source of xanthan gum and is available from CP Kelco.

Cellosize® QP 100MH is used as the source of hydroxyethyl cellulose and is available from Dow Chemical Company.

Example 1—Processes for Preparation of Compositions of the Invention

Process 1

The salting-out agent was dissolved in water while stirring. Excipients including antifreeze agent, surfactants, polyvinyl alcohol, antifoam agent, and preservative were then added sequentially under continuous agitation until the composition was homogeneous. Once homogenous, metribuzin and optionally, other active ingredients were added to the composition. After mixing under high-shear agitation, the composition was wet milled to a median particle size of about 2 micrometers ("µM") using zirconia beads to create a mill base. Separately, the thickener was added to water under high-shear agitation to create a thickener dispersion. Post-milling, the thickener dispersion was added and blended with the mill base. If necessary, additional water was added to adjust the composition to the final desired active ingredient(s) concentration.

Process 2

Excipients including antifreeze agent, surfactants, polyvinyl alcohol, antifoam agent, and preservative were added sequentially to water under continuous agitation until the composition was homogeneous. Once homogenous, metribuzin and optionally, other active ingredients were added to the composition. After mixing under high-shear agitation, the composition was wet milled to a median particle size of about 2 µM using zirconia beads to create a mill base. Separately, the thickener was added to water under high-shear agitation to create a thickener dispersion. Post milling, a solution of the salt in water was added to the mill base with agitation. The thickener dispersion was then added and blended with the mill base. If necessary, additional water was added to adjust the composition to the final desired active ingredient(s) concentration.

Process 3

Thickener was added to water under continuous agitation, which continued until the composition was homogenous (about 15-20 minutes) to create a thickener dispersion. Excipients such as antifreeze agent, surfactants, polyvinyl alcohol, antifoam agent, and preservative were added sequentially to the thickener dispersion under continuous agitation to create excipient solution. Once homogenous, metribuzin and optionally, other active ingredients were added to the excipient solution to create a millable dispersion. After mixing under high-shear agitation, the millable dispersion was wet milled to a median particle size of about 2 µM using zirconia beads to create a mill base. Post milling, a solution of the salt in water was added to the mill base with agitation. If necessary, additional water was added to adjust the composition to the final desired active ingredient(s) concentration.

Example 2—Metribuzin Solubility in Salt Solutions

Method

Metribuzin is partially soluble in water. Because of its partial solubility metribuzin grows crystals in aqueous solutions. It is a discovery of the present invention that, if water solubility of metribuzin is lowered, then crystal growth is inhibited or reduced. To determine if salts could lower the water solubility of metribuzin, metribuzin was added to the saturation point to several concentrations of ammonium sulfate, ammonium acetate and potassium citrate tribasic monohydrate solutions. Results can be seen in FIG. 1.

Results

As seen in FIG. 1, the concentration of each of ammonium sulfate, ammonium acetate and potassium citrate tribasic monohydrate was negatively correlated with the water solubility of metribuzin. These results are evidence that salts can lower the water solubility of metribuzin.

Example 3—Metribuzin Stability

Method

Variations of Composition 1 from Table 1, above, were subjected to extreme temperatures to determine long-term storage stability including the likelihood of large crystals growing that cause clogging of the spray nozzle by performing the wet sieve test. Specifically, these compositions containing various amounts of polyvinyl alcohol and ammonium sulfate were subjected to 2 weeks at 54° C. and 4 weeks at 50° C. accelerated aging. The wet sieve test typically was performed soon after the samples were brought back to room temperature using the following protocol:

A bottle containing the composition was emptied onto a 100-mesh sieve positioned on top of a receiver. Water was added to the bottle, shaken to rinse, and the rinse solution was poured onto the mesh to wash off the material. The rinsing step was repeated until visible quantity of residue on the mesh remained constant. If necessary, additional, minimum streams of water were introduced by way of a squirt or spray bottle to further clear the mesh. Typically, about 250 milliliters of water was used for about 40 grams of sample. The mesh was then dried to a constant weight and observed under a microscope.

Percent wet sieve residue is calculated by the following equation: mass sieve residue/mass sample*100, and presented as a percentage of residue that did not pass through a 100-mesh sieve. Results can be seen in Table 2, below.

TABLE 2

| Composition | 1A | 1B | 1C | 1D |
|---|---|---|---|---|
| polyvinyl alcohol (as active/solid) | — | — | 2.9% | 2.9% |
| ammonium sulfate | — | 2.9% | — | 2.9% |
| Sieve Residue % (<0.05% desirable) | | | | |
| 54° C. (2 weeks) | n/a Crystals | n/a No crystals | n/a Crystals | n/a No crystals |
| 50° C. (4 weeks) | 0.013% Crystals | 0.020% Crystals | 0.032% Crystals | 0.046% No crystals | n/a denotes that exact value of percent wet sieve residue was not obtained and only visual examination of crystal growth was performed.

Results

As can be seen in Table 2, Compositions 1B and 1D inhibited crystal growth. Thus, polyvinyl alcohol alone is not sufficient to inhibit metribuzin crystal growth.

Example 4—Metribuzin Stability

Method

Variations of Composition 2 from Table 1, above, were subjected to several conditions to determine long-term storage stability including % wet sieve test residue. Specifically, these compositions contained 0% or 2.8% w/w of polyvinyl alcohol and 0% or 2.8% w/w ammonium sulfate or 0% or 2.8% or 5.6% w/w potassium citrate and were subjected to 2 weeks at 54° C. and 4 weeks at 50° C. Results can be seen in Table 3 below.

TABLE 3

| Composition | 2A | 2B | 2C | 2D | 2E | 2F |
|---|---|---|---|---|---|---|
| polyvinyl alcohol (as active/solid) | — | — | 2.8% | — | — | 2.8% |
| Ammonium sulfate | — | 2.8% | 2.8% | — | — | — |
| Potassium citrate | — | — | — | 2.8% | 5.6% | 2.8% |
| Sieve Residue % (<0.05% desirable) | | | | | | |
| 54° C. (2 weeks) | 0.024^ | 0.024 | 0.002 | 0.01 | 0.006 | 0.007 |
| 50° C. (4 weeks) | 0.007^ | 0.006* | 0.005* | 0.005 | 0.007 | 0.006 |

*denotes presence of small crystals.
^denotes presence of large crystals.

Results

Ammonium sulfate reduced crystal growth to small crystals that mostly do not get caught in the sieve when sprayed. Potassium citrate completely inhibited crystal growth under these accelerated aging conditions. The addition of polyvinyl alcohol further reduced crystal growth and lowered sieve residue for compositions containing ammonium sulfate.

Example 5—Metribuzin Stability

Method

Variations of Composition 3 from Table 1 above were subjected to several conditions to determine long-term storage stability including % wet sieve test residue. Specifically, these compositions contained 0 or 2.8% w/w of polyvinyl alcohol and 0% or 2.8% w/w ammonium sulfate and were subjected to 2 weeks at 54° C. Results can be seen in Table 4 below.

TABLE 4

| | Composition | | |
|---|---|---|---|
| | 3A | 3B | 3C |
| polyvinyl alcohol (as active/solid) | — | — | 2.8% |
| Ammonium sulfate | — | 2.8% | 2.8% |
| Sieve Residue % (<0.05% desirable) | | | |
| 54° C. (2 weeks) | 0.008^ | 0.003^ | 0.003 |

^denotes presence of large crystals.

Results

Ammonium sulfate reduced the amount of crystals isolated on the sieve substantially. The addition of polyvinyl alcohol further reduced crystal growth and lowered sieve residue.

Example 6—Metribuzin Stability

Method

Variations of Composition 4 from Table 1, above, were subjected to several conditions to determine long-term storage stability including % wet sieve test residue. Specifically, these compositions contained 0% or 2.8% w/w of polyvinyl alcohol and 0% or 2.8% w/w ammonium sulfate and were subjected to 2 weeks at 54° C. Results can be seen in Table 5 below.

TABLE 5

| Composition | 4A | 4B | 4C |
|---|---|---|---|
| polyvinyl alcohol (as active/solid) | — | — | 2.8% |
| Ammonium sulfate | — | 2.8% | 2.8% |
| Sieve Residue % (<0.05% desirable) | | | |
| 54° C. (2 weeks) | 0.004^ | 0.006 | 0.004 |

^denotes presence of large crystals.

Results

Ammonium sulfate inhibited crystal growth and lowered sieve residue. The addition of polyvinyl alcohol further lowered sieve residue.

Example 7—Metribuzin Stability

Method

Compositions 5-7 from Table 1, above, were subjected to several conditions to determine long-term storage stability including % wet sieve test residue. Specifically, these compositions contained 1.4% or 1.5% w/w of polyvinyl alcohol and 2.0% or 2.8% w/w ammonium sulfate and were subjected to 2 weeks at 54° C. and 4 weeks at 50° C. Results can be seen in Table 6 below.

TABLE 6

| Composition | 5 | 6 | 7 |
|---|---|---|---|
| polyvinyl alcohol (as active/solid) | 1.4% | 1.4% | 1.5% |
| Ammonium sulfate | 2.0% | 2.0% | 2.8% |
| Sieve Residue % (<0.05% desirable) | | | |
| 54° C. (2 weeks) | 0.005 | 0.004 | 0.007* |
| 50° C. (4 weeks) | 0.003* | 0.005* | 0.008 |

*denotes presence of small crystals.

Results

The combination of ammonium sulfate and polyvinyl alcohol helped reduce crystal growth such that only very low amounts (≤0.008%) of small crystals, if any, were isolated under these high temperature conditions.

Thus, it can be seen from examples in Tables 2-6 that the combination of a salting-out agent and polyvinyl alcohol greatly reduces the chance of large metribuzin crystals clogging the spray nozzle during application of this formulation.

What is claimed is:

1. An herbicidal composition comprising:
   only three active ingredients consisting of from about 10% to about 20% w/w metribuzin, from about 1% to about 15% w/w of flumioxazin, and from about 1% to about 10% w/w pyroxasulfone;
   from about 1% to about 3% w/w of a salt selected from ammonium sulfate, ammonium acetate and potassium citrate; and
   from about 1% to about 5% w/w polyvinyl alcohol,
   wherein w/w denotes weight by total weight of the composition and wherein the composition is a suspension.

2. The composition of claim 1, wherein:
   metribuzin is present at a concentration from about 15% to about 17% w/w;
   flumioxazin is present at a concentration from about 4% to about 12% w/w;
   pyroxasulfone is present at a concentration from about 5% to about 7% w/w;
   the salt is ammonium sulfate at a concentration from about 1.8% to about 3.0% w/w; and
   polyvinyl alcohol is present at a concentration from about 1.2% to about 3.0% w/w.

3. An herbicidal composition comprising:
   only three active ingredients consisting of about 15.9% w/w metribuzin, about 5.3% w/w flumioxazin, and about 6.8% w/w pyroxasulfone;
   about 2.8% w/w ammonium sulfate; and
   about 2.8% w/w polyvinyl alcohol,
   wherein w/w denotes weight by total weight of the composition and wherein the composition is a suspension.

4. The composition of claim 3, further comprising:
   about 4% w/w of a 35% acrylic graft copolymer;
   about 2% w/w of an alkylphenol ethoxylate free nonionic wetter;
   about 4% w/w propylene glycol;
   about 0.1% w/w of a silicone emulsion;
   about 0.15% w/w of a mixture of 1.15% 5-chloro-2-methyl-4-isothiazolin-3-one and 0.35% 2-methyl-4-isothiazolin-3-one; and
   about 1% w/w magnesium aluminum silicate.

5. An herbicidal composition comprising:
   only three active ingredients consisting of about 15.9% w/w metribuzin, about 5.3% w/w flumioxazin, and about 6.8% w/w pyroxasulfone;
   about 2.0% w/w ammonium sulfate; and
   about 1.4% w/w polyvinyl alcohol,
   wherein w/w denotes weight by total weight of the composition and wherein the composition is a suspension.

6. The composition of claim 5, further comprising:
   from about 4% to about 6% w/w of a 35% acrylic graft copolymer;
   about 2% w/w of an alkylphenol ethoxylate free nonionic wetter;
   about 4% w/w propylene glycol;
   about 0.3% w/w of a silicone emulsion;
   about 0.2% w/w of 19.3% 1, 2-benzisothiazolin-3-one;
   from about 0.50% to about 0.75% w/w magnesium aluminum silicate; and
   from about 0.15% to about 0.225% w/w hydroxyethyl cellulose.

7. A method of controlling a weed consisting of applying the composition of claim 1 to the weed or an area in need of weed control.

* * * * *